(12) United States Patent
Farkas et al.

(10) Patent No.: US 11,593,530 B2
(45) Date of Patent: Feb. 28, 2023

(54) SYSTEM AND METHOD FOR INTRUSION DETECTION

(71) Applicant: DELL PRODUCTS, LP, Round Rock, TX (US)

(72) Inventors: Sandor Farkas, Round Rock, TX (US); Bhyrav M. Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1078 days.

(21) Appl. No.: 16/251,721

(22) Filed: Jan. 18, 2019

(65) Prior Publication Data

US 2020/0233985 A1 Jul. 23, 2020

(51) Int. Cl.
| | |
|---|---|
| *G06F 21/86* | (2013.01) |
| *H05K 5/02* | (2006.01) |
| *H03B 5/12* | (2006.01) |
| *G01R 27/26* | (2006.01) |
| *G08B 13/08* | (2006.01) |
| *G08B 13/00* | (2006.01) |
| *H01F 19/00* | (2006.01) |

(52) U.S. Cl.
CPC ......... *G06F 21/86* (2013.01); *G01R 27/2605* (2013.01); *G08B 13/00* (2013.01); *G08B 13/08* (2013.01); *H03B 5/1271* (2013.01); *H05K 5/0208* (2013.01); *H05K 5/0221* (2013.01); *G06F 2200/1633* (2013.01); *H01F 19/00* (2013.01)

(58) Field of Classification Search
CPC . G06F 21/86; G06F 2200/1633; G08B 13/00; G08B 13/08; G08B 13/149; H05K 5/0208; H05K 5/0221
See application file for complete search history.

(56) References Cited

U.S. PATENT DOCUMENTS

| | | | | |
|---|---|---|---|---|
| 4,808,973 | A * | 2/1989 | Siev | G08B 13/08 340/545.4 |
| 5,504,425 | A * | 4/1996 | Fericean | G01V 3/102 324/207.16 |
| 5,712,621 | A * | 1/1998 | Andersen | G08B 13/08 324/207.16 |
| 6,420,972 | B1 * | 7/2002 | Loose | G07F 17/3241 219/722 |
| 9,668,371 | B1 | 5/2017 | Stmiska et al. | |
| 2014/0007217 | A1 | 1/2014 | Thomas | |
| 2017/0104770 | A1 | 4/2017 | Jreij et al. | |

FOREIGN PATENT DOCUMENTS

| | | | |
|---|---|---|---|
| CN | 207799433 U | * | 8/2018 |
| WO | WO 2015/102710 A2 | | 7/2015 |
| WO | WO 2016/032464 A1 | | 3/2016 |
| WO | WO-2017111619 A1 | * | 6/2017 |

\* cited by examiner

*Primary Examiner* — Ryan Johnson
(74) *Attorney, Agent, or Firm* — Larson Newman, LLP

(57) ABSTRACT

An information handling system includes an intrusion detection circuit having two inductors and an amplifier circuit. The amplifier circuit is configured to identify an increase in inductive coupling between the inductors in response to a change in position of a cover.

19 Claims, 5 Drawing Sheets

SYSTEM AND METHOD FOR INTRUSION DETECTION

FIELD OF THE DISCLOSURE

This disclosure relates generally to information handling systems, and more particularly relates to intrusion detection at an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. As information handling systems become essential fixtures in our homes and businesses, it is important that they are secure from both software and physical intrusion.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

SUMMARY

An information handling system may include an enclosure having a cover. An intrusion detection circuit may include a first inductor, a second inductor, and an amplifier circuit. The amplifier circuit is configured to identify an increase in inductive coupling between the first and second inductor in response to a change in position of the cover.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
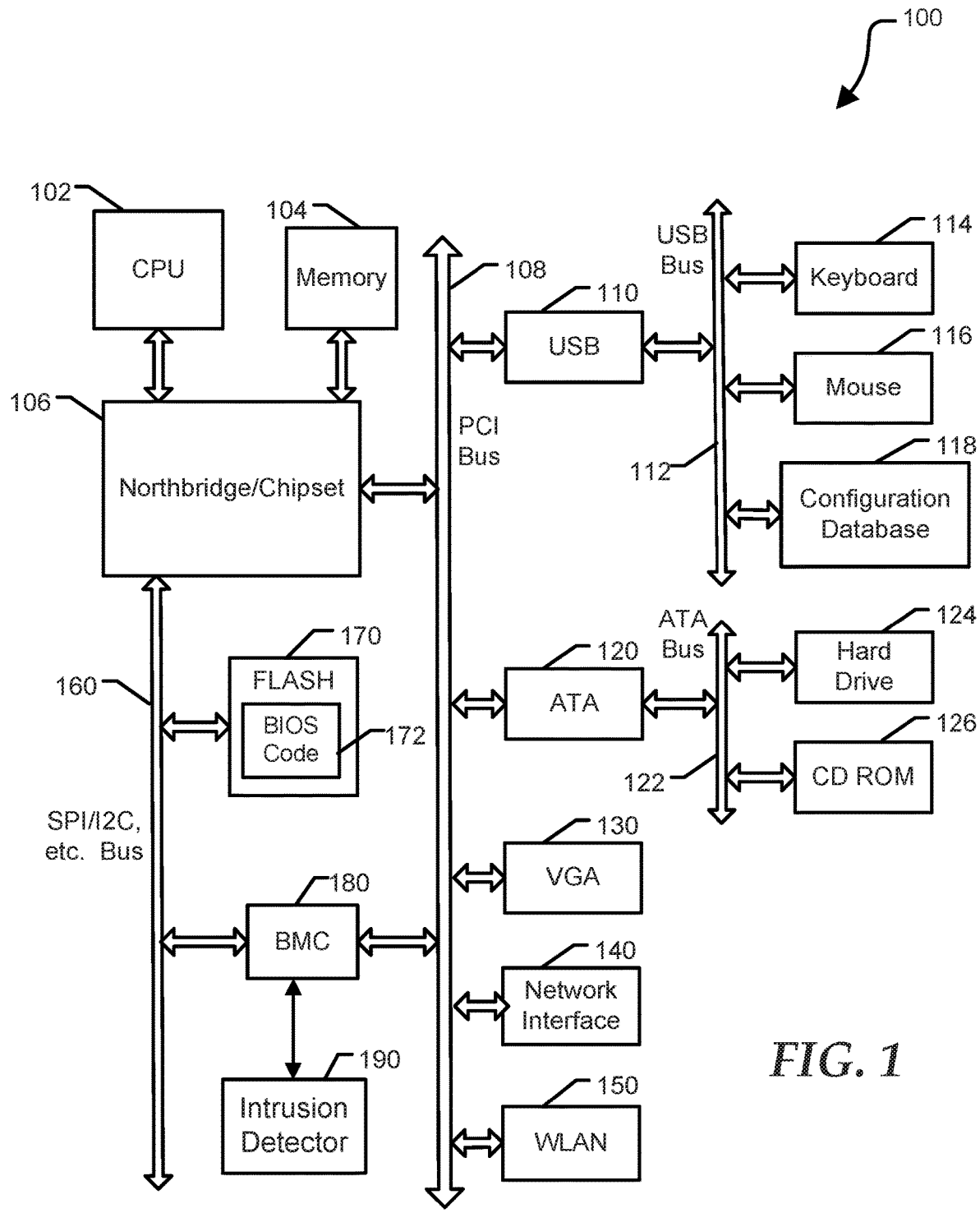
FIG. 1 is a block diagram of an information handling system according to an embodiment of the present disclosure.

FIG. 1 illustrates an information handling system 100 including a processor 102, a memory 104, a northbridge/chipset 106, a PCI bus 108, a universal serial bus (USB) controller 110, a USB 112, a keyboard device controller 114, a mouse device controller 116, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170, a baseboard management controller (BMC) 180, and an intrusion detector 190. NVRAM 170 can store a basic input/output system (BIOS) 172.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BMC 180 can be configured to provide out-of-band access to devices at information handling system 100. As used herein, out-of-band access refers to operations performed independent of an operating system executing at system 100, including operations performed prior to execution of BIOS 172 by processor 102 to initialize operation of system 100. BMC 180 can provide a network interface, a graphical user interface (GUI) and an application programming interfaces (API) to support remote management of system 100. In an embodiment, BMC 180 can include one or more proprietary or standardized bus interfaces, for example USB, I2C, and the like. Intrusion detector 190 is communicatively coupled to BMC 180 and is configured to provide an indication to BMC 180 in an event that an enclosure housing information handling system 100 has been breached.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. In an embodiment, the BIOS 172 can be substantially compliant with one or more revisions of the UEFI specification.

The integrity of information handling systems is important. Security protocols can include detecting unauthorized physical access to components included within an information handling system enclosure. Traditionally, physical intrusion circuits have utilized a mechanical electric switch. However, a switch can be defeated and can be expensive to implement. FIGS. 1-6 illustrate techniques for detecting physical intrusion at an information handling system that provide greater security and can be implemented at a reduced cost compared to intrusion detection systems utilizing a mechanical electric switch. Moreover, the disclosed circuits operate at a very low power level, so that the intrusion detection system can operate for multiple years using power provided by a button-style battery cell, even when the information handling system is not receiving power.

Figure 2:
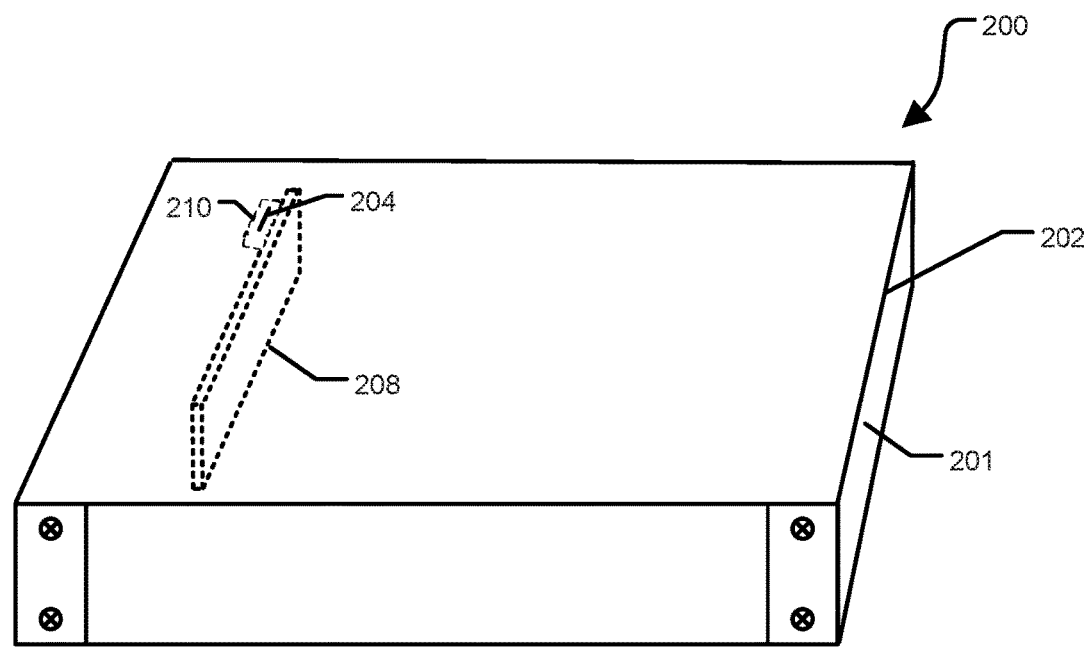
FIG. 2 is a block diagram illustrating a simplified view of an information handling system according to a specific embodiment of the present disclosure.

FIG. 2 shows a simplified view of an information handling system 200 according to a specific embodiment of the present disclosure. Information handling system 200 is housed in an enclosure 201 that includes an enclosure cover 202. Attached to cover 202 is a metal tab 204. Information handling system 200 also includes an assembly 208, for example a riser-card. An intrusion detector 210 is installed at assembly 208 so as to align with metal tab 204 when cover 202 is installed. When cover 202 is removed or otherwise shifted from a closed position, metal tab 204 will no longer be aligned with intrusion detector 210. Alternatively, intrusion detector 210 can be located elsewhere within enclosure 201, for example attached to a side panel of enclosure 201, while metal tab 204 is positioned to align with detector 210 when cover 202 is in a closed position.

Figure 3:
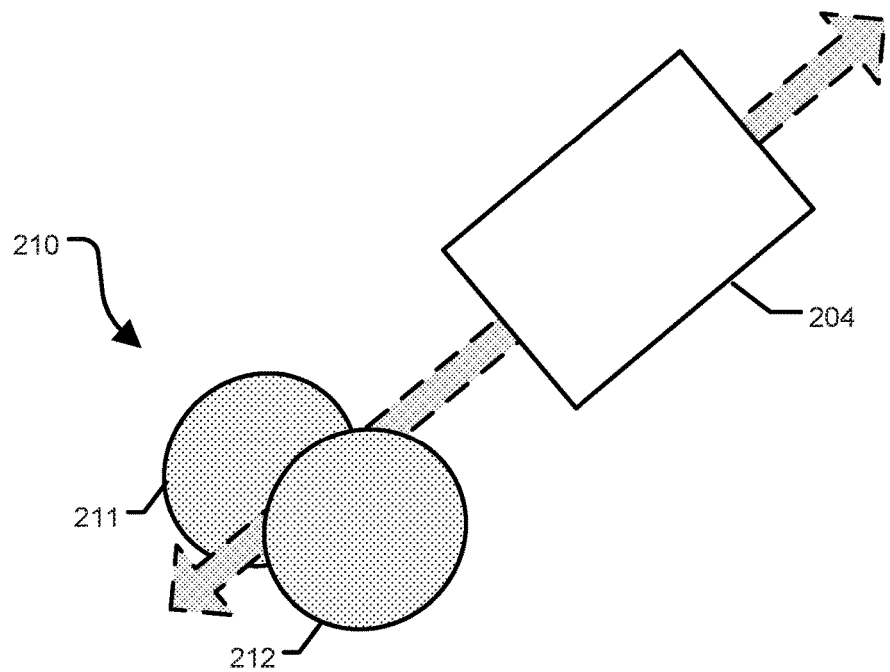
FIG. 3 is a block diagram illustrating further details of an intrusion detector according to a specific embodiment of the present disclosure.

FIG. 3 shows further details of intrusion detector 210 according to a specific embodiment of the present disclosure. In particular, intrusion detector 210 includes a first inductor 211 and a second inductor 212. In an embodiment, inductors 211 and 212 can each include a planar spiral trace etched at a printed circuit board. The planar surfaces of inductors 211 and 212 are physically aligned and adjacent to each other, separated by a space sufficient to receive metal tab 204 between the inductors when cover 202 is installed in a closed position. Cover 202 can be arranged to lift or slide off of the enclosure 201, causing metal tab 204 to no longer be positioned between inductors 211 and 212. In particular, when metal tab 204 is positioned between inductors 211 and 212, inductive coupling between the inductors is substantially reduced, as metal tab 204 interrupts magnetic flux induced by one inductor from interacting with the other inductor. When cover 202 is removed or otherwise misaligned from the closed position, metal tab is no longer positioned between inductors 211 and 212, and magnetic flux induced by one inductor can now couple with the other inductor. In another embodiment, metal tab 204 can be integral to intrusion detector 210. For example, tab 204 can be implemented as a lever that positions tab 204 between inductors 211 and 212 when cover 202 is in a closed position, and is configured to pivot out of the position between inductors 211 and 212 when cover 202 is opened.

Figure 4:
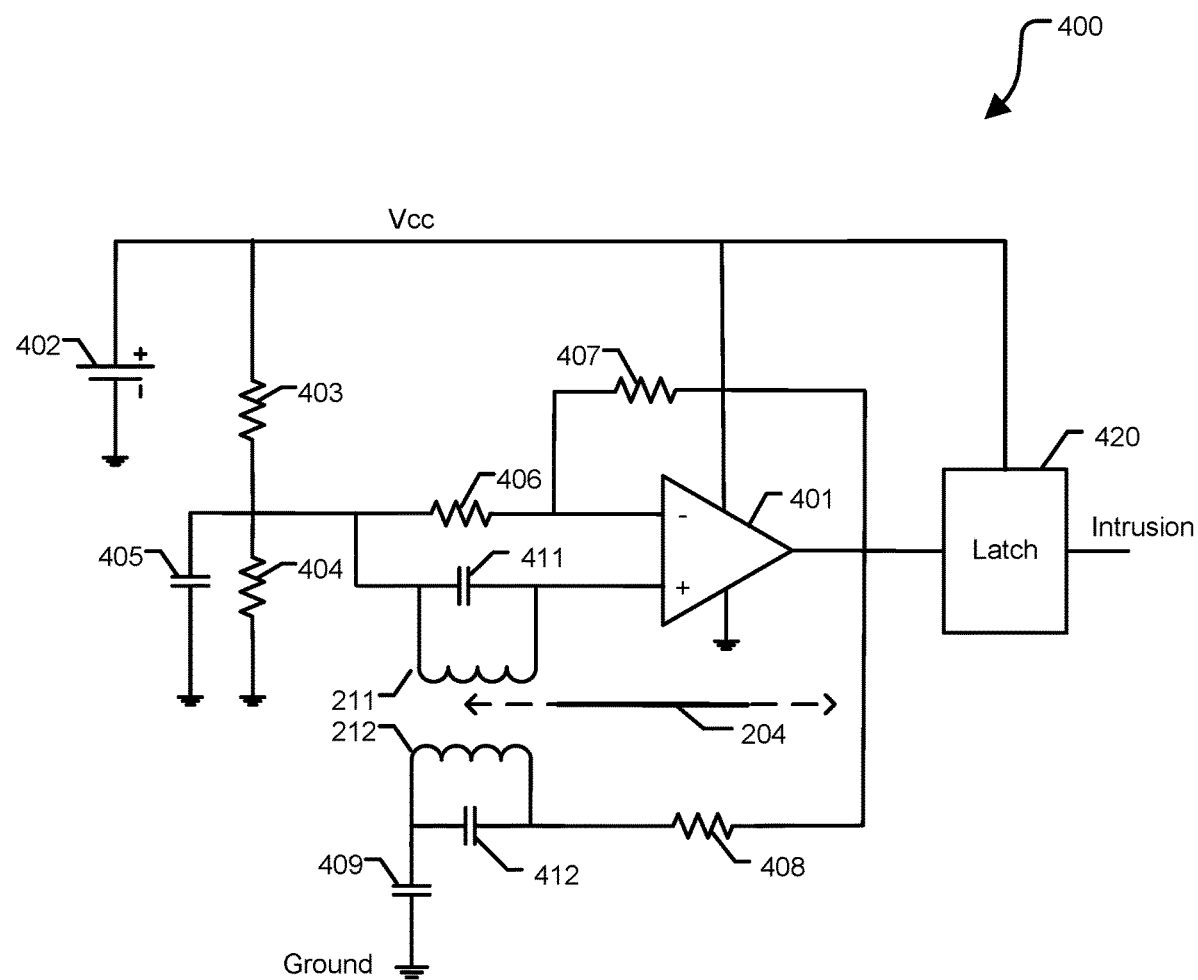
FIG. 4 is a schematic diagram illustrating an intrusion detector circuit according to a specific embodiment of the present disclosure.

FIG. 4 shows a circuit 400 of an intrusion detector according to a specific embodiment of the present disclosure. Circuit 400 receives power from a battery 402 to provide voltage reference Vcc, for example a button cell. A button cell may be referred to as a coin cell. Circuit 400 may also receive main power or auxiliary power from information handling system 100 when such a power source is available. Circuit 400 includes an amplifier 401, for example a low-power operational amplifier. Amplifier 400 includes an inverting input and a non-inverting input. Resistors 403 and 404, and capacitor 405 are configured to provide a bias voltage, for example Vcc/2. Resistors 407 and 406 of circuit 400 are connected to the inverting input of amplifier 400 in a typical negative feedback configuration to provide, in lieu of other circuit components, a fixed amplifier gain, for example a gain of twenty. An inductor 211 and capacitor 411 are connected in parallel to provide a tuned LC circuit, as are inductor 212 and capacitor 412. In an embodiment, each tuned circuit is configured to have substantially the same resonant frequency. Inductor 411 is coupled to the non-inverting input of amplifier 401 and inductor 412 is coupled to the output of amplifier 401. Together with resistor 408, inductive coupling between inductors 411 and 412 can form a series-connected circuit that can provide positive feedback to amplifier 401.

When tab 204 is positioned between inductor 211 and inductor 212, there is minimal inductive coupling between inductors 211 and 212, and consequently there is minimal positive feedback from the output of amplifier 410 to the non-inverting input of amplifier 401. However, when tab 204 is not positioned between inductor 211 and inductor 212, there is relatively greater inductive coupling between inductors 211 and 212, and consequently there is enough positive feedback from the output of amplifier 410 to the non-inverting input of amplifier 401 to cause amplifier 401 to oscillate. In particular, silicon noise inherent in amplifier 401 provides an initial signal that drives the circuit into oscillation based on the positive feedback. A latch 420 includes an input coupled to the output of amplifier 401 and an output to provide an intrusion indicator. During operation with cover 202 in a closed position, amplifier 401 does not oscillate, latch 420 is not set, and the intrusion indicator is not asserted. In the event of an intrusion at system 100, amplifier 401 begins to oscillate causing latch 420 to be set, asserting the intrusion indicator. Power consumption at circuit 400 can be very low when amplifier 401 is not oscillating, so that a single button cell can provide operating power for multiple years.

Figure 5:
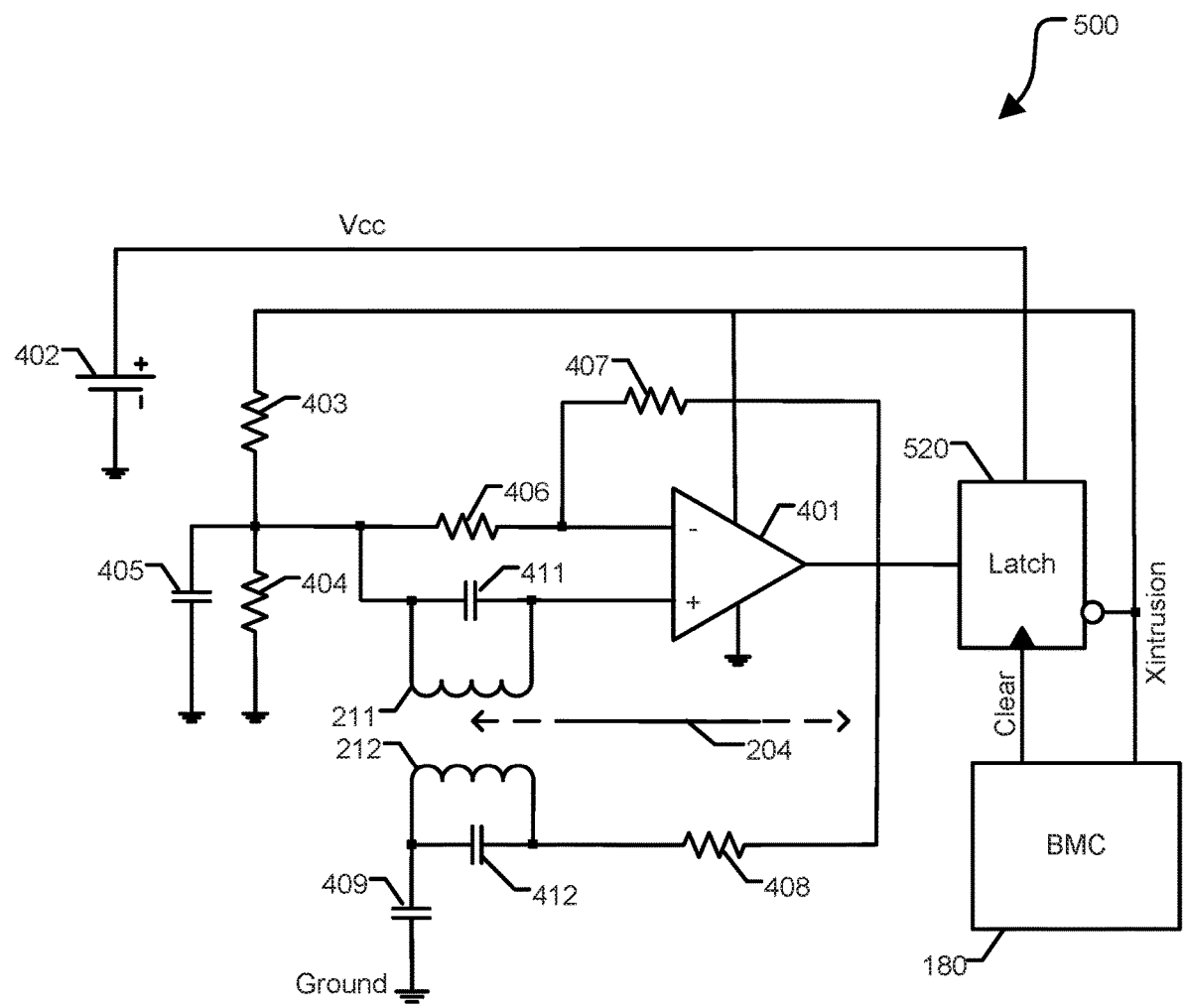
FIG. 5 is a schematic diagram illustrating an intrusion detector circuit according to another embodiment of the present disclosure.

FIG. 5 shows a circuit 500 of an intrusion detector circuit according to another embodiment of the present disclosure. Circuit 500 is substantially the same as circuit 400, however latch 520 includes an active-low output that is used to provide power to amplifier 401 and the voltage reference circuit including resistors 403 and 404, and capacitor 405. When cover 202 is in place so that metal tab 204 is preventing coupling between inductors 211 and 212, amplifier 401 is not oscillating, and latch output Xintrusion is at a logic-high state, indicating no intrusion. Accordingly, signal Xintrusion is at a voltage level of approximately VCC, which provides power to amplifier 401. If cover 202 is moved so that metal tab 204 is no longer between inductors 211 and 212, amplifier 401 begins to oscillate, and latch output Xintrusion transitions to a logic-low state, for example a ground potential, indicating an intrusion. Because signal Xintrusion is at a logic-low value, amplifier 401 is no longer receiving power, and oscillation stops. Accordingly, amplifier 401 only remains in an oscillating condition for the brief time required to set latch 520 and to assert intrusion indicator Xintrusion. Latch 520 is powered by button cell 402 and maintains assertion of intrusion indicator until latch 520 is cleared by BMC 180 in response to BMC 180 asserting signal Clear in response to acknowledging reception of signal Xintrusion. Until BMC 180 activates the Clear signal to reset latch 520, button cell 402 is only providing power to latch 520, thereby increasing the operating life of button cell 402. While an operational amplifier is utilized in circuits 400 and 500, one of skill will appreciate that another type of amplifier circuit can be used, for example a discrete transistor amplifier circuit.

Figure 6:
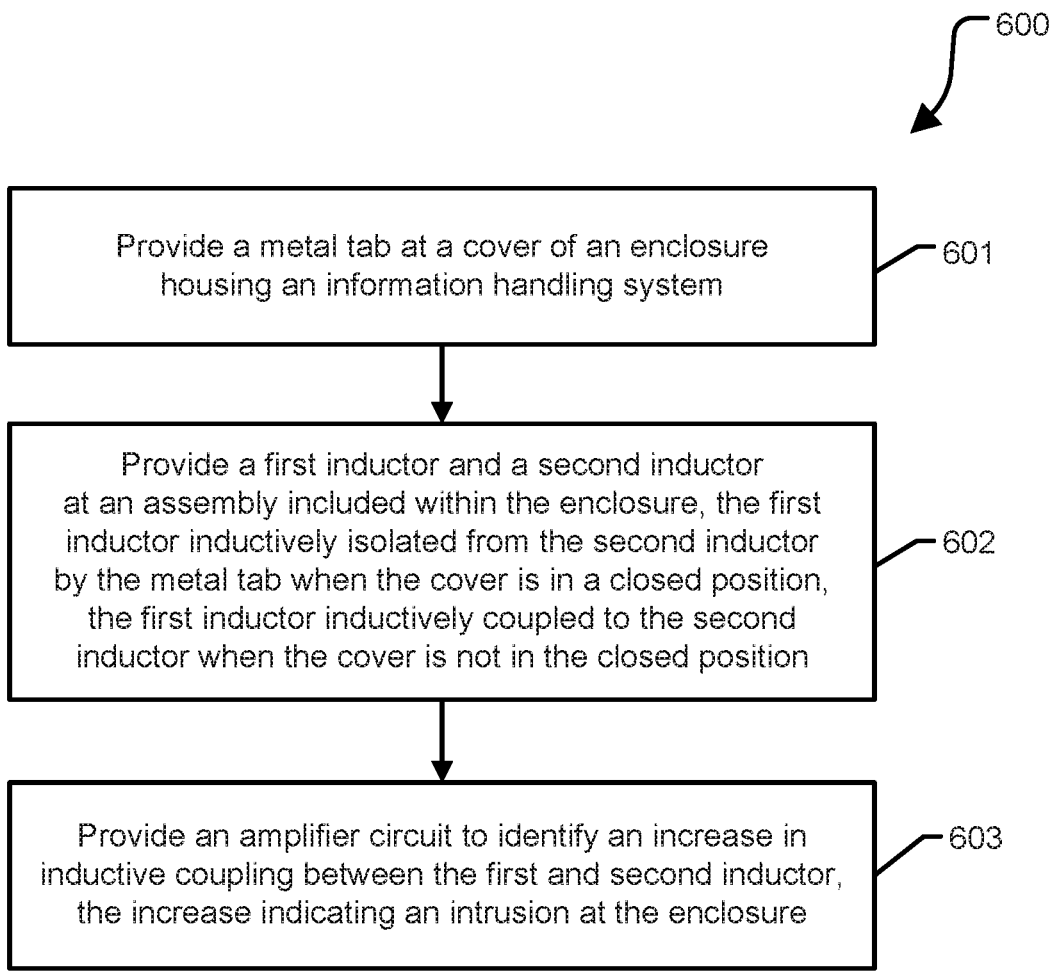
FIG. 6 is a flow diagram illustrating a method for implementing an intrusion detector according to another embodiment of the present disclosure.

FIG. 6 shows a method 600 for implementing an intrusion detector according to another embodiment of the present disclosure. Method 600 begins at block 601 where a metal tab is provided at an enclosure cover of an information handling system. For example, metal tab 204 can be attached to cover 202 as shown at FIG. 2. Method 600 continues at block 602 where a first inductor and a second inductor are provided at an assembly included within the enclosure. When the cover is in a closed position, the metal tab is positioned between the two inductors so that the first inductor is inductively isolated from the second inductor. When the cover is not in the closed position, the metal tab is no longer positioned between the two inductors so that the first inductor is inductively coupled to the second inductor. Method 600 completes at block 603 where an amplifier circuit is provided to identify an increase in inductive coupling between the first and second inductor, the increase indicating an intrusion at the enclosure. For example, amplifier 401 at circuit 500 of FIG. 5 is driven into oscillation when cover 202 is moved based on positive feedback provided by the inductively coupled inductors 211 and 212. Latch 520 is configured to be set in response to the oscillation, thereby asserting signal Xintrusion to a logic-low value to indicate that an intrusion has occurred at information handling system 100.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   an enclosure including a cover; and
   an intrusion detection circuit including:
      a first inductor;
      a second inductor; and
      an amplifier circuit to identify an increase in inductive coupling between the first and second inductors in response to a change in position of the cover;
   wherein the cover includes a metal tab that is positioned between the first inductor and the second inductor when the cover is in a closed position and is not positioned between the first inductor and the second inductor when the cover is not in the closed position.

2. The information handling system of claim 1, wherein the amplifier circuit oscillates in response to the increase in inductive coupling.

3. The information handling system of claim 2, wherein the intrusion detection circuit includes a latch, an output of the latch to change logic states in response to the oscillation.

4. The information handling system of claim 1, further comprising a baseboard management controller, the intrusion detection device to notify the baseboard management controller in response the identifying.

5. The information handling system of claim 4, wherein the intrusion detection circuit includes a latch that is set to indicate an intrusion based on the identifying, and wherein the baseboard management controller is to reset the latch in response to receiving the intrusion indication.

6. The information handling system of claim 1, further comprising a button cell, the intrusion detection circuit receiving power exclusively from the button cell.

7. The information handling system of claim 1, wherein the inductively coupled first and second inductors form a series circuit having a first terminal coupled to an output of the amplifier and a second terminal coupled to a non-inverting input of the amplifier.

8. The information handling system of claim 1, wherein the intrusion detection circuit includes a latch that is set to indicate an intrusion based on the identifying, and wherein power to the amplifier circuit is interrupted in response to setting the latch.

9. A method comprising:
   providing a metal tab at a cover of an enclosure housing an information handling system;
   providing a first inductor and a second inductor at an assembly included within the enclosure, the first inductor inductively isolated from the second inductor by the metal tab when the cover is in a closed position, the first inductor inductively coupled to the second inductor when the cover is not in the closed position; and
   providing an amplifier circuit to identify an increase in inductive coupling between the first inductor and the second inductor, the increase indicating an intrusion at the enclosure.

10. The method of claim 9, wherein the amplifier circuit oscillates in response to an increase in inductive coupling between the first inductor and the second inductor.

11. The method of claim 10, further comprising setting a latch in response to the oscillation.

12. The method of claim 11, further comprising providing the indication of the intrusion to a baseboard management controller included at the information handling system.

13. The method of claim 12, wherein the baseboard management controller is to reset the latch in response to receiving the indication of the intrusion.

14. The method of claim 11, further comprising interrupting power to the amplifier circuit in response to setting the latch.

15. The method of claim 9, further comprising providing power to the amplifier circuit exclusively by a button cell.

16. An intrusion detection circuit, comprising:
   an amplifier;
   a first inductor electrically coupled to an output of the amplifier;
   a second inductor electrically coupled to an input of the amplifier, the first inductor inductively coupled to the second inductor in response to an intrusion; and
   a latch device to store an indication of the intrusion.

17. The intrusion detection circuit of claim 16, wherein the amplifier oscillates in response to the inductive coupling.

18. The intrusion detection circuit of claim 16, wherein the latch is to provide the indication to a baseboard management controller at an information handling system.

19. The intrusion detection circuit of claim 16, wherein the first inductor is inductively coupled to the second inductor in response to moving a metal tab away from a position between the first inductor and the second inductor, the metal tab attached to an enclosure cover of an information handling system.

* * * * *